United States Patent [19]

Roethel

[11] Patent Number: 5,031,662
[45] Date of Patent: Jul. 16, 1991

[54] ADAPTER COUPLING FOR BEVERAGE SYSTEMS

[75] Inventor: Henry G. Roethel, Ravenna, Ohio

[73] Assignee: The Meyer Company, Cleveland, Ohio

[21] Appl. No.: 555,919

[22] Filed: Jul. 20, 1990

[51] Int. Cl.$^5$ ............................................. F16L 29/00
[52] U.S. Cl. ............................. 137/614.03; 251/149.6
[58] Field of Search ..................... 251/149.6, 7, 8; 137/614, 614.03

[56] References Cited

U.S. PATENT DOCUMENTS

| | | | |
|---|---|---|---|
| 2,505,093 | 4/1950 | Brock | 137/614.03 X |
| 3,550,626 | 12/1970 | Daniels et al. | 137/614.03 |
| 4,146,018 | 3/1979 | Aldridge et al. | 251/7 X |
| 4,948,014 | 8/1990 | Rutter et al. | 137/614.04 X |

Primary Examiner—John C. Fox
Attorney, Agent, or Firm—Fay, Sharpe, Beall, Fagan, Minnich & McKee

[57] ABSTRACT

A quick connect/disconnect assembly particularly intended for connecting a beverage dispensing system service line to the spout of a flexible beverage bag comprises a first component having a cylindrical body with an inlet end for connection to the spout, and an outlet end in flow communication with the inlet end through a central flow passage. An inlet valve is located at the inner end for controlling flow through the central flow passageway. A valve operating slide is located in the central flow passageway for selectively moving the inlet valve to an open position. A second component is arranged for connection to the first component and comprises a hollow cylindrical housing having an open axial end and carrying a connecting nut for connecting the housing in axially aligned relationship with the open axial end of the cylindrical body. A passage extends axially into the housing from the open axial end and a fixed support extends axially of the passage and terminates in a circular end wall located axially outward of the open axial end of the housing and in axial alignment with the passage. A cylindrical sleeve is slidably mounted on the fixed support and continually biased toward the circular end wall such that it maintains the passage closed until the first and second components are joined at which time the sleeve is caused to slide away from the circular end wall.

10 Claims, 3 Drawing Sheets

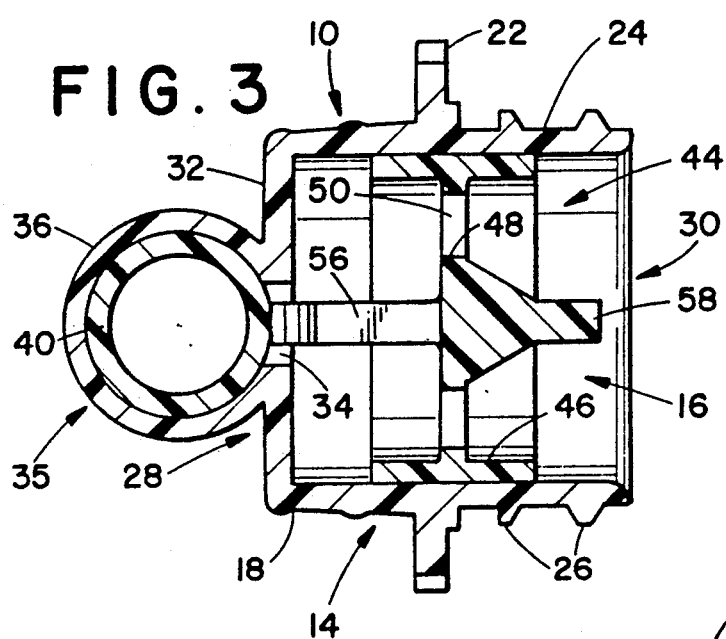
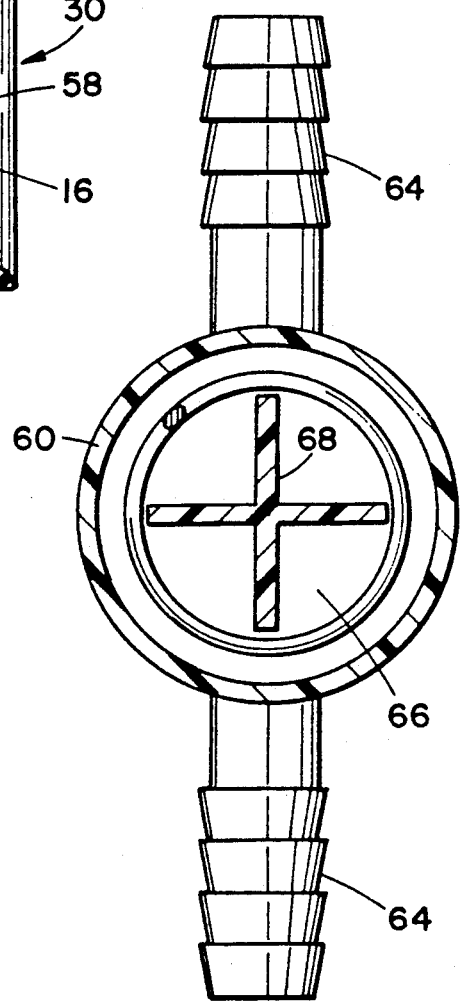
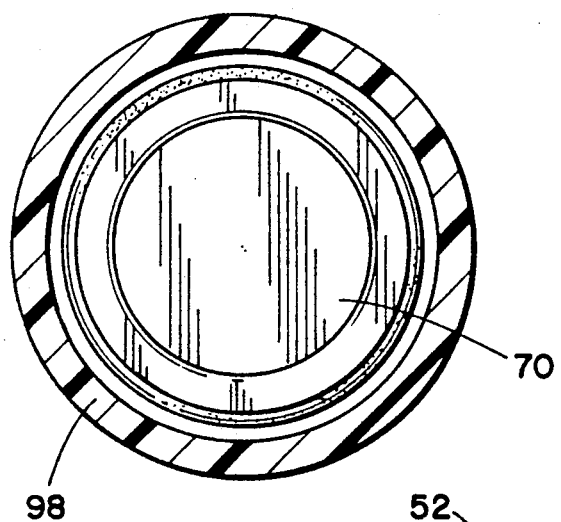
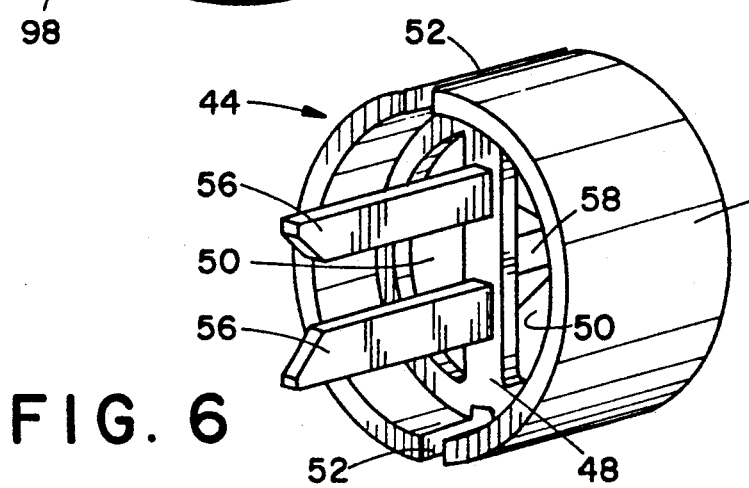

ADAPTER COUPLING FOR BEVERAGE SYSTEMS

BACKGROUND OF THE INVENTION

The subject invention is directed toward the art of quick connect/disconnect couplings for use in beverage dispensing systems. The coupling of the invention is particularly intended for use in connecting flexible beverage bags to associated service systems and will be described with reference thereto; however, as will become apparent, the invention could be used in other environments and for other purposes.

Beverage dispensing systems which use flexible bags for storage of the beverage are well known and in widespread use. In these systems, it is necessary that the storage bags be connected and disconnected quickly and efficiently. In addition, the connecting and disconnecting must preferably be accomplished without wasting beverage liquid through leakage, uncontrolled opening of the connection components and the like.

In addition to the above, it is highly desirable that the coupling components be simple and inexpensive in design and capable of connecting with a minimum of force application.

BRIEF STATEMENT OF INVENTION

In accordance with the subject invention, there is provided a valved outlet specifically intended for connection to a fluid spout on a flexible beverage container. According to the invention, the outlet comprises a cylindrical body having a central flow passage which extends from an inlet end for connection with the spout to an outlet end for discharging fluid entering the flow passage from the inlet end. A valve means is located at the inlet end for controlling fluid flow from the spout into the inlet end. According to a preferred embodiment, the valve means includes a molded, open ended, tubular member which extends transversely of the axis of the cylindrical body and is joined to the inlet of the body. A flow opening communicates the interior of the tubular member with the central flow passage and a resilient valving tube member is radially compressed within the tubular member to sealingly overlie the flow opening. Positioned within the flow passage and operable from the outlet end of the body is an operating means which is capable of selectively deflecting the valving tube away from the flow opening to permit fluid flow from the interior of the tubular member to the central flow passage.

Preferably, the operating means is in the form of a slide member mounted for axial movement in the flow passage and having an actuating portion extendable through the flow opening for engagement with the tubular member. In addition, a member carried on the slide extends toward the outlet end of the flow passage to a position where engagement from the exterior of the body is possible.

In accordance with a still further aspect of the invention, there is provided a quick connect/disconnect assembly which is particular intended for connecting a beverage dispensing system service line to the outlet spout of a flexible beverage bag. The assembly comprises a first component in the form of a cylindrical body with an inlet end for connection to the spout and an outlet end in flow communication with the inlet through a central flow passage. An inlet valve is located at the inner end of the flow passage for controlling flow through the inner end into the flow passage. In addition, a valve operating slide is located in the central flow passage for selectively moving the inlet valve to an open position. A second component is adapted for connection to the first component and includes an arrangement whereby the slide member is moved to move the inlet valve to an open position. The second component generally comprises a hollow, cylindrical housing having an open axial end and carrying a nut means on the exterior thereof for connecting the housing in axially aligned relationship with the open axial end of the first component. A cylindrical passage extends axially into the housing from the open axial end. A fixed support extends axially of the passage and terminates in a flow impervious circular end wall located axially outward of the open axial end for engagement with the slide member of the first component when the first and second components are placed in joined relationship. Associated with the fixed support is a cylindrical seal or slide valve which is carried thereon and is continually biased toward the fluid impervious circular end wall for sealing engagement therewith. Positioned about the exterior of the cylindrical slide member are suitable seals for engaging with the interior of the cylindrical passage and providing a seal therewith. Cooperating radially extending shoulders are provided to engage with the outlet end of the first component during joining of the first and second components to cause the cylindrical slide member to move away from the impervious disk member to allow fluid flow therethrough.

The various components of the subject assembly can be formed as relatively simple plastic moldings to provide a relatively inexpensive disposable coupling. Additionally, because of the simplicity of the design, the two coupling components can be used in conjunction with other commercially available units to provide a high degree of interchangability.

As can be seen from the foregoing, a primary object of the invention is the provision of a coupling assembly which is particularly suited for use in flexible beverage bag storage and service systems.

A still further object is the provision of a coupling assembly of the type described which is extremely simple to use and which can be coupled without loss of beverage fluid or unwanted leakage.

A still further object is the provision of a coupling of the type described wherein the coupling components can be manually connected and disconnected without the use of tools or the like.

BRIEF DESCRIPTION OF THE DRAWINGS

The above and other objects and advantages will become apparent from the following description when read in conjunction with the accompanying drawings wherein:

FIG. 3 through 5 are cross-sectional views taken on lines 3—3, 4—4, and 5—5, respectively, of FIG. 1; and FIG. 6 is a pictorial view of the operating slide member used in one of the components.

DETAILED DESCRIPTION OF THE PREFERRED EMBODIMENTS

Figure 1:
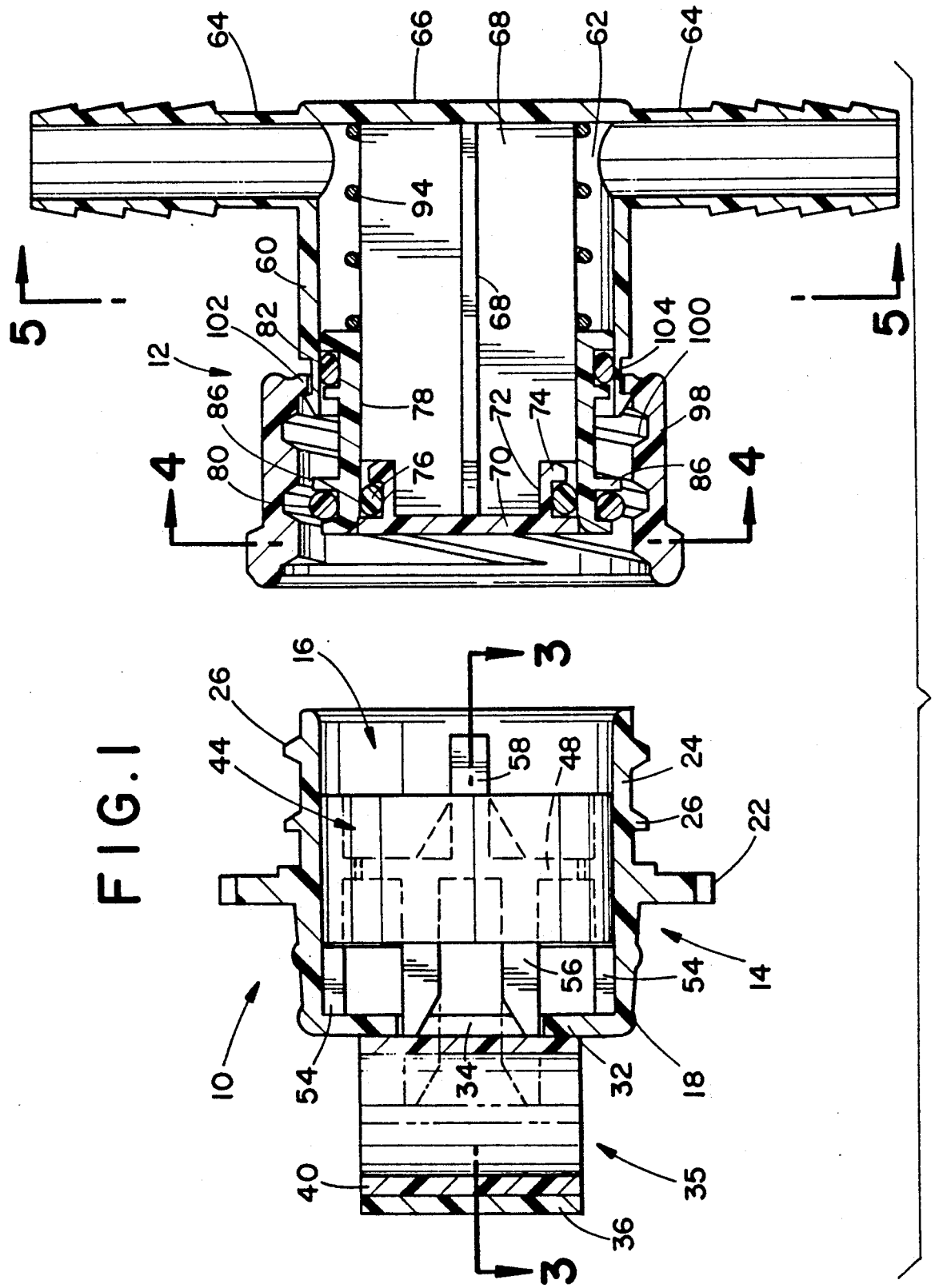
FIG. 1 is a longitudinal cross-sectional view of the coupling components in aligned but uncoupled and closed positions.
Figure 2:
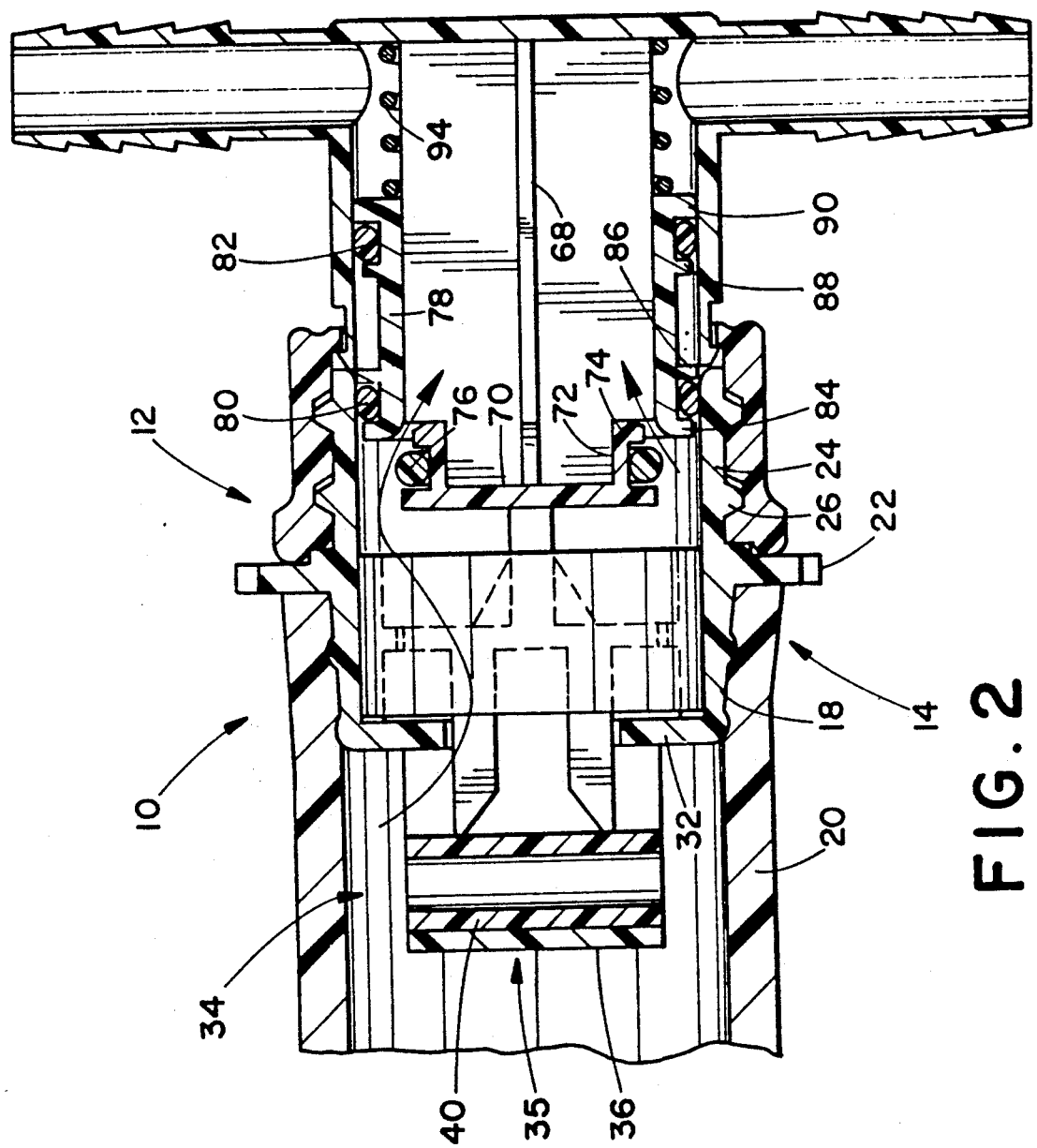
FIG. 2 is a view similar to FIG. 1 but showing the components in a coupled position with their internal valves in the open position.

Referring more particularly to the drawings wherein the showings are for the purpose of illustrating a preferred embodiment of the invention only, and not for the purpose of limiting same, FIGS. 1 and 2 show the overall arrangement of a coupling assembly formed in accordance with the invention and comprising a first coupling component 10 adapted to join with and provide a mechanical and flow connection with a second coupling component 12. According to the subject embodiment, each of the coupling components 10 and 12 are preferably injection molded from a suitable plastic to provide a relatively inexpensive coupling structure.

The coupling component 10 can best be understood by reference to FIGS. 1 through 3 wherein it is shown as having a main cylindrical body portion 14 which defines a central flow passage 16 that extends axially through the body. A first cylindrical end portion 18 is sized so as to be capable of being closely and sealingly received within the outlet spout 20 of a conventional beverage storage bag (not shown). The body 14 further includes a radially extending flange portion 22 which limits the insertion of the body into the spout 20. Additionally, the cylindrical right-hand end 24 of body 14 is provided with suitable external threads 26 which, as will subsequently be described, provide means for connecting the second coupling component 12 thereto.

The passageway 16 has an inlet end 28 and an outlet end 30. The inlet end 28 includes a wall portion 32 which extends radially inward and terminates in a vertically elongated elliptical inlet opening 34.

Associated with the inlet end 28 of the body 14 is a valve assembly 35. The valve assembly 35 comprises a tubular body 36 which is integrally molded to the end wall 32 and which extends with its center axis perpendicular to the center axis of body 14. As illustrated, the tubular body 36 is preferably of cylindrical shape and is open at its opposite ends as illustrated. As can be seen from FIGS. 2 and 3, the interior of the tubular member 36 communicates with the central flow passage 30 of body 14 through the inlet opening 34. In order to provide a valving control of the opening 34, there is a resilient tube 40 positioned within the tubular member 36. The resilient tube 40 is formed of rubber or similar resilient elastomeric material and is located in the tubular member 36 under substantial compressive force so as to sealingly overlie and close off the inlet opening 34. While in the position illustrated in FIGS. 1 and 3, the opening 34 is closed and flow cannot take place between the interior of the beverage bag nozzle and the central flow passage 16. However, when the tube 40 is deflected away from the inlet 34 as illustrated in FIG. 2 and 3, flow can pass from the interior of the beverage bag to the flow passage 16.

The means for selectively deflecting the tube 40 away from opening 34 comprises a slide member 44 which is located within the flow passage 16 and mounted for selective sliding movement therein. The actual preferred shape and configuration of the slide member 44 is best illustrated in FIG. 6. As shown therein, it comprises a central sleeve-like body 46 which has an outer diameter so as to be closely but slidably received within the interior of passage 16. Located in the axial center of the sleeve 46 is a transversely extending wall 48 which includes a pair of spaced elongated openings 50 formed therethrough. The sleeve 46 is arranged so as to be guided within the passageway 16 by a pair of inwardly extending diametrically opposed slots 52 which are sized to receive suitable guide ribs 54 (see FIG. 1) which extend inwardly from the interior of passageway 16. These ribs 54 and their cooperation with the slots 52 allow free axial sliding movement of member 46 while preventing unwanted rotary movement.

Extending from the left side of the central wall 48 are a pair of fingers 56 which are sized and spaced so as to pass freely through the inlet opening 34. Extending from the opposite side of the wall 48 is an operating stem 58. The operating member 58 provides means for causing the slide member to move to a position to produce opening of the valve tube 40 when the components are in the coupled position of FIG. 2.

The actual operation and interrelation between the two components 10 and 12 will become better understood with a full appreciation of the construction and arrangement of component 12. As best seen in FIGS. 1, 4, and 5, the coupling component 12 generally comprises a main cylindrical body 60 having a cylindrical interior chamber 62 and a pair of outlet tubes 64. The outlet tubes 64 provide means for connection of the coupling component 12 to associated beverage dispensing lines connected with suitable dispensing taps, outlet nozzles, or the like. In the subject embodiment, the outlet tubes 64 are illustrated as arranged for connection with conventional hose lines through the use of standard barb exteriors. Of course, other types of outlet connections could be provided on the tubes 64. Moreover, the coupling component 12 could be provided with any number of such outlet tubes 64.

Formed integrally with the cylindrical body 60 and extending laterally from the end wall 66 is a central support member 68 which, as best seen in FIG. 5, has a X-shaped cross-inwardly section. Additionally, the support member 68 is axially located within the chamber 62 and extends to the left (as viewed in FIG. 1) out of the cylindrical body 60.

At the left-hand end (as viewed in FIGS. 1 and 2) of the central support member 68, there is permanently affixed thereto a liquid impervious disk member 70 having a circular configuration and an axially extending sleeve portion 72 which terminates in a radially outwardly extending flange 74. A suitable O-ring member 76 is positioned in the radially outwardly extending groove defined by the peripheral portion of disk 70 and the flange 74.

Carried on the support member 68 for axial sliding movement thereon is a valve sleeve member 78 which has a cylindrical configuration and an inner diameter which is closely but slidably received on the outer ends of the X-shaped cross-sections of the support member 68. O-rings 80, 82 are carried at the opposite ends of the sleeve as shown. The O-rings are maintained in their desired position by spaced sets of radially extending flanges 84 and 86 and 88, 90. The flanges 88, 90 have an outer diameter which is only slightly less than the inner diameter of the chamber 62. Flange 86, however, extends radially outward a distance slightly greater than the interior diameter of chamber 62 and, for reasons which will subsequently be described, is slightly larger in diameter than the interior diameter of passageway 16 in coupling component 10.

As can be seen from FIGS. 1 and 2, a spring member 94 is arranged to maintain the sleeve member biased to the left.

The maximum outward movement of the sleeve member 78 is limited by engagement between the outer radial periphery of disk member 70 and the end of sleeve 78 as illustrated in FIG. 1. When sleeve 78 is in the FIG. 1 position, a seal is present between the disk member 70 and the interior of the sleeve 78 by virtue of the O-ring 76. Additionally, the O-ring 82 is sealed with the interior of the cylindrical body 60. In this position, as illustrated in FIG. 1, flow cannot enter the chamber 62. However, when the components 10 and 12 are properly engaged and interrelated, the sleeve valve 78 is moved to the right against the bias of spring 94 and flow can take place about the disk member 70 and into the interior of chamber 62. Coupling engagement and joining of the components is provided by a cylindrical female nut member 98 which is suitably received about the exterior of the body 60. As illustrated, the nut member 98 is internally threaded as shown at 100 and sized so as to mate with the external threads 26 on the end 24 Of component 10. A radially inward extending flange portion 102 is fitted within a groove 104 on body 60. This relationship retains the nut member on the body 60 while allowing it to be rotatable relative thereto.

To join the coupling components 10 and 12, they are moved to the aligned position shown in FIG. 1 and then brought axially together and the nut member 98 tightened onto the threaded exterior 26 of member 10. As the tightening takes place, the disk member 70 engages the end of operating stem 58 and causes the slide member 44 to be moved to the left with the fingers 56 entering through the outlet 34 and deflecting the valve tube 40 to the left to the dotted line position shown in FIGS. 1 and 3. Simultaneously with this movement, the right-hand end of the component 10 engages with the O-ring 80 and the flange 86. This creates a seal between the exterior of sleeve 78 and the interior of coupling 10 portion 24. It also causes the sleeve 78 to be slid to the right against the bias of spring 94 to open the flow passage about disk 70. This final connected relationship is shown in FIG. 2.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A valved outlet for connection to a fluid spout on a beverage container or the like comprising:
a first component having a cylindrical body with a central flow passage extending axially therethrough, the body having an inlet end for connection with the spout and an outlet end for discharging fluid entering said flow passage from the inlet end;
a valve means at the inlet end for controlling fluid flow from the spout into the inlet end, the valve means including an open ended tubular member extending transversely of the axis of the cylindrical body and joined to the inlet end of the body, a flow opening communication the interior of said tubular member with the central flow passage, a resilient valving tube member radially compressed within said tubular member to sealingly overlie the flow opening;
operating means within the flow passage operable from the outlet end of the body for selectively deflecting the valving tube member away from the flow opening to permit fluid flow from the interior of the tubular member to the central flow passage; and,
a second component comprising a hollow cylindrical housing having an open axial end and carrying means for connecting the housing in axially aligned relationship with the open axial end joined to the outlet end of the cylindrical body, a cylindrical passage extending axially into the housing from the open axial end, a fixed support extending axially of the cylindrical passage and terminating in a fluid impervious circular end wall located axially outwardly of the open axial end of the cylindrical housing and in axial alignment with the cylindrical passage, a cylindrical sleeve slidably mounted on the fixed support and continually biased toward the circular end wall.

2. A valved outlet assembly as defined in claim 1 wherein the operating means comprises a slide mounted for axial movement in said central flow passage and having an actuating portion extendable through the flow opening for engagement with the tubular member.

3. The valve outlet assembly as defined in claim 1 wherein said valve sleeve has a circumferential sealing which sealingly engages the wall defining the central flow passage in the first component.

4. A valved outlet for connection to a fluid spout on a beverage container or the like comprising:
a cylindrical body having a central flow passage extending axially therethrough, the body having an inlet end for connection with the spout and an outlet end for discharging fluid entering said flow passage from the inlet end;
a valve means at the inlet end for controlling fluid flow rom the spout into the inlet end, the valve means including an open ended tubular member extending transversely of the axis of the cylindrical body and joined to the inlet end of the body, a flow opening communicating the interior of said tubular member with the central flow passage, a resilient valving tube member radially compressed within said tubular member to sealingly overlie the flow opening; and,
operating means located completely within the central flow passage operable from the outlet end of the body for selectively deflecting the valving tube member away from the flow opening to permit fluid flow from the interior of the tubular member to the central flow passage, said operating means comprising a cylindrical slide with an axially extending central flow passage extending therethrough, said operating means mounted for axial movement in said central flow passage and having an actuating portion supported by said cylindrical slide extendable through the flow opening for engagement with the tubular member.

5. A valved outlet assembly as defined in claim 4 wherein the tubular member is open at both ends.

6. A valved outlet assembly as defined in claim 4 wherein the tubular member has a generally cylindrical interior.

7. A valved outlet assembly as defined in claim 6 wherein the tubular member is formed integrally with the body and extends perpendicular to the axis of the cylindrical body.

8. A valved outlet assembly for connection to a fluid spout on a beverage container or the like comprising:
a first component having a cylindrical body with a wall defining a central flow passage extending axially therethrough, the body having an inlet end for connection with the spout and an outlet end for discharging fluid entering said flow passage from the inlet end;
a valve means at the inlet end for controlling fluid flow from the spout into the inlet end, the valve means including an open ended tubular member extending transversely of the axis of the cylindrical body and joined to the inlet end of the body, a flow opening communicating the interior of said tubular member with the central flow passage, a resilient valving tube member radially compressed within said tubular member to sealingly overlie the flow opening;
operating means within the flow passage operable from the outlet end of the body for selectively deflecting the valving tube member away from the flow opening to permit fluid flow from the interior of the tubular member to the central flow passage, said operating means comprising a slide mounted for axial movement in said central flow passage and having an actuating portion extendable through the flow opening for engagement with the tubular member;
a second component comprising a housing with means for connecting said second component to said first component at the outlet end, said second component including an inner passage extending into the housing in fluid communication with the central flow passage in said first component, a valve means in said inner passage, and cooperating engageable portions on said slide and said valve means for moving said slide to a position to move said valving tube away from said flow opening when said first component is connected with said second component.

9. The valve outlet assembly as defined in claim 8 wherein said valve means in said second component comprises a valve sleeve carried on a fixed support in said inner passage.

10. The valved outlet assembly as defined in claim 9 wherein biasing means are provided for maintaining said valve sleeve under a continual bias toward said slide.

* * * * *